United States Patent [19]

Shimatani et al.

[11] Patent Number: 5,084,285

[45] Date of Patent: Jan. 28, 1992

[54] DESALTING PROCESS OF MILK

[75] Inventors: Masaharu Shimatani, Sayama; Akinori Shigematsu, Kawagoe; Yasunobu Hiraoka, Hannou; Yuuzi Murakami, Tokorozawa; Tadashi Idota, Kawagoe, all of Japan

[73] Assignee: Snow Brand Milk Products, Co., Ltd., Hokkaido, Japan

[21] Appl. No.: 531,361

[22] Filed: May 31, 1990

[30] Foreign Application Priority Data

Jun. 1, 1989 [JP] Japan ............................ 1-139507

[51] Int. Cl.$^5$ ............................................. A23C 9/14
[52] U.S. Cl. ................................... 426/271; 210/685; 426/330.2; 426/491; 426/583
[58] Field of Search ............... 426/271, 239, 330.2, 426/580, 583, 491; 210/685

[56] References Cited

U.S. PATENT DOCUMENTS 2,879,166  3/1959  Wilcox ......................... 426/271
4,138,501  2/1979  Chaveron et al. ............ 426/271

Primary Examiner—Donald E. Czaja
Assistant Examiner—Leslie Wood
Attorney, Agent, or Firm—Millen, White & Zelano

[57] ABSTRACT

A desalted milk whose pH and ash content have been both adjusted to desired values can be obtained by subjecting a raw milk, including whole milk, whey, permeate, mother liquor, skim milk or buttermilk, to electrodialysis and cation exchange process, adding a milk of a specific pH value to the resultant milk, and then subjecting the thus-obtained milk to anion exchange process.

6 Claims, No Drawings

DESALTING PROCESS OF MILK

BACKGROUND OF THE INVENTION

1. Field of the Invention

The present invention relates to a process for producing a desalted milk by subjecting whole milk, whey, permeate, mother liquor, skim milk, buttermilk, or the like (hereinafter called a "raw milk") successively to electrodialysis, cation exchange process and exchange process, and more specifically to a process for producing a desalted milk, which has desired pH and ash content, in a similar manner without using a neutralizer or the like.

2. Description of the Related Art

Raw milks have heretofore been used widely as they are or after removal or desalting of ash or drying into powder depending on their application purposes, namely, as beverage or as raw materials for foods or other beverage, for example, as raw materials for market milk, confectionery, bread, infant formula and the like.

In many of such applications, desalting is needed since ash tends to affect the flavor and the like. The use of a desalted raw milk is essential for the production of infant formula in particular, because the ash content is specified not to exceed 2.2 wt % by law. Known desalting methods include (1) treatment of a raw milk by electrodialysis, (2) treatment with both a cation exchange resin and an anion exchange resin, (3) treatment by electrodialysis to desalt a portion of salt, followed by treatment with both a cation exchange resin and an anion exchange resin.

Of these three methods, the method (3) is used more often for its superior overall economy, including both initial and running costs, and also its capability of achieving desalting to a higher degree compared with the methods (1) and (2).

Depending on the application purpose, pH adjustment may be needed for a desalted milk after the desalting treatment since the pH has been changed by the desalting treatment no matter which one of the above methods was employed.

Known methods for the above pH adjustment include (1) incorporation of a neutralizing agent such as sodium hydroxide or potassium hydroxide in a desalted milk (U.S. Pat. No. 4,138,501) and (2) addition of an undesalted milk to a desalted milk (French Patent 1,523,106).

These methods (1) and (2) are however accompanied by one or more problems. In the case of the method (1) featuring the addition of a neutralizing agent, sodium or potassium which is a sort of ash is contained at a high level as a result of the neutralization. Turning to the method (2) in which an undesalted milk is added, the addition of the undesalted milk results in an increase of the ash content of the desalted milk by the ash contained in the undesalted milk, whereby the desalting treatment may be rendered meaningless.

In other words, these methods are accompanied by the problem that the desired ash content cannot be achieved if the emphasis is placed on the pH adjustment of the desalted milk whereas the intended pH adjustment cannot be attained if the primary concern is concentrated on the ash content.

SUMMARY OF THE INVENTION

The present invention has been completed with a view toward overcoming such conventional problems. An object of this invention is therefore to obtain a desalted milk while simultaneously achieving the two purposes, namely, desalting and a desired pH. It has now been found that this object can be attained by adding a partly-desalted milk or an undesalted milk either alone or as a mixture to a milk in an intermediary stage of the desalting process.

In one aspect of the present invention, there is thus provided a process for producing a desalted milk by successively subjecting a raw milk to electrodialysis, cation exchange process and anion exchange process. After the cation exchange process but before the anion exchange process, the resultant partly-desalted milk is added with a milk of pH 6.0-7.0 so as to obtain the desalted milk with desired pH value and ash content after the anion exchange process.

The process of the present invention has made it unnecessary to adjust the pH of a desalted milk by adding a neutralizing agent to the desalted milk or directly adding an undesalted milk to the desalted milk as heretofore practiced in the production of the desalted milk. By the addition of the specific milk after the cation exchange process but before the anion exchange process, it is possible to easily and surely obtain a desalted milk having desired pH and low ash content without increasing the ash content of the desalted milk as a final product or facing difficulties in pH adjustment.

DETAILED DESCRIPTION OF THE INVENTION AND PREFERRED EMBODIMENTS

The term "raw milk" as used herein embraces whole milk and various liquid byproducts derived from whole milk, such as whey, permeate, mother liquor, skim milk and buttermilk, as well as liquids containing various powder-like milk products dissolved therein. They can be used either singly or in combination.

Cow milk, goat milk, sheep milk or the like can be used as whole milk. Whey is a liquid obtained by eliminating byproduced coagulates upon production of casein or cheese by adding an acid or rennet to whole milk or skim milk. There are various kinds of whey, including acid casein whey, rennet casein whey, coprecipitated casein whey, cheese whey, etc. They are all usable.

Permeate means a byproduct upon production of WPC (whey protein concentrates) or MP (milk proteins) by ultrafiltration or microfiltration or whey, whole milk, skim milk, buttermilk or the like.

Mother liquor means a byproduct upon production by the crystallization of crude milk sugar from whey or permeate. Mother liquor may also mean a refined mother liquor byproduct upon production by the crystallization of refined milk sugar from crude milk sugar as a raw material.

Further, skim milk means a fluid milk which is obtained by removing milk fat from whole milk. Buttermilk means a fluid milk which is byproduced upon production of butter from the thus-removed milk fat as a raw material.

The solid contents and ash contents of these raw milks vary depending on the kinds. Their values are approximately as shown in Table 1.

TABLE 1

| Kind | Solid content (%) | Ash content (%) |
| --- | --- | --- |
| Whole milk | 10–14 | 5–7 |
| Whey | 5–7 | 7–14 |
| Permeate | 4–8 | 7–18 |
| Mother liquor | 5–20 | 5–30 |
| Skim milk | 8–12 | 6–10 |
| Buttermilk | 5–7 | 5–10 |

Note 1) All designations of % are wt. %.
Note 2) Ash content is based on solids.

In the present invention, these raw milks can be subjected directly to electrodialysis as the first step in the desalting process. However, it is preferable to preconcentrate them to a solid content of about 7–40% by evaporation or reverse osmosis etc. so as to improve the efficiency of the subsequent desalting process.

The electrodialyzer used can be a conventional apparatus as long as it can be employed for the electrodialysis of a milk. It is, however, preferred to use an electrodialyzer which can eliminate about 30–70% of the ash. After the electrodialysis, the pH of the resultant milk generally ranges from 6.0 to 7.0.

Next, the thus-electrodialyzed milk is subjected to cation exchange process to remove cations. As a cation exchange resin, either a strongly acidic or weakly acidic resin can be used. Exemplary cation exchange resins include "Amberlite IR-120B", "Amberlite IRC-50", "Duolite C-20HC", "Duolite C-464", "Duolite C-225", "DIAION SK 1B", "DIAION PK 208", "Dowex HCR-S", and "Dowex CCR-S" (all trade names), and the like. They must exhibit cation exchanging ability in the pH range of electrodialyzed milks to be fed therethrough. The amount of the cation exchange resin can be suitably determined depending on the amount and the kind of a raw milk to be treated and the desired desalting rate.

The electrodialyzed milk is then fed through the cation exchange resin, preferably under the following conditions: flow rate $SV = 2-7$ l/l·resin·Hr; concentration (solid content) = 5–40%; temperature = 5–50° C.

Any flow rate can however be used as long as the desired desalting rate can be achieved. In addition, it is not absolutely necessary to limit the concentration and temperature to the above ranges provided that milk sugar does not crystallize.

According to the present invention, prior to anion exchange process, a fresh supply of a milk of pH 6.0–7.0 is added in a desired amount to the milk which has been obtained by subjecting a raw milk to electrodialysis and further to cation exchange process to remove cations (metal ions).

In this regard, the amount of the milk to be added is in a proportion of from about 1 to 45 parts by weight per 100 parts by weight of the milk which has been subjected to the cation exchange process.

As the milk of pH 6.0–7.0, it is possible to use the milk which has been subjected to the above-described electrodialysis to desalt a portion of ash. It is also possible to use the raw milk not subjected to such process.

The addition of the fresh supply of the milk of pH 6.0–7.0 can be achieved, for example, by drawing out —through a bypass line—a portion of the electrodialized milk, i.e., the milk whose ash content has been reduced to 70—30% of the ash content of the raw milk. The bypass line is connected to a pipeline immediately after a column of a cation exchange resin, so that the portion of the electrodialyzed milk is mixed into the milk which has just flowed out of the column of the cation exchange resin. It is hence possible to easily achieve pH control by adjusting the amount of milk of pH 6.0–7.0 to be added.

Instead of or in addition to the electrodialyzed milk, a portion of the raw milk such as whole milk may also be added to the milk which has just flowed out of the column of the cation exchange resin. This can be achieved by branching out a portion of the raw milk without subjecting it to electrodialysis and then introducing it in the undesalted form into the cation-exchanged milk.

The milk which has been subjected to cation exchange process to adjust its pH and ash content as described above is then subjected to anion exchange process to remove anions.

As an anion exchange resin, either a strongly basic anion exchange resin or a weakly basic anion exchange resin can be used. Exemplary anion exchange resins include "Duolite A-116", "Amberlite IRA-416", "Amberlite IRA-410", "DIAION PA318", "DIAION PA418", "Dowex 11", "Dowex HCR-W2", "Duolite A-368PR", "Amber-lite IRA-93", "SUMIKAION KA-890", "DIAION WA21", and "Dowex MWA-1"(all trade names), and the like.

The cation-exchanged and pH-adjusted milk can be passed through a column of the anion exchange resin under similar conditions to those employed for the electrodialyzed milk upon its passage through the column of the cation exchange resin.

According to the process of the present invention, it is possible to easily adjust the ash content and pH to intended levels. Namely, the pH can be adjusted to a lower level by decreasing the amount of the raw milk or ED milk (electrodialyzed milk) or to a higher level by increasing the amount of the raw milk or ED milk. On the other hand, the ash content can be adjusted to a lower level by decreasing the addition ratio of ED milk to desalted milk obtained after the cation exchange process or to a higher level by increasing the addition ratio of ED milk to desalted milk obtained after the cation exchange process.

In the manner described above, the desalted milk is obtained with a desired pH in a range of from 3 to 11. The desalting can be archived to an ash content in a range of from 0.1% to 5.0% based on the whole solid contents.

The milk desalted as described above can be added in the liquid state to a stock for another food, for example, to a modified milk for producing powder milk or the like or to a drink stock.

The desalted mile which has been produced in accordance with the process of this invention can be concentrated and dried into powder milk by a method known per se as needed, whereby its storability and handling can be improved to expand its application range.

The process of the present invention has therefore obviated the need for the adjustment of the pH of a desalted milk by adding a neutralizing agent to the desalted milk or direct incorporating an undesalted milk (raw milk) in the desalted milk unlike the conventional art upon production of the desalted milk. As a result, it is possible to easily and surely obtain a desalted milk having an intended low ash content and a desired pH without increasing the ash content in the final product.

The present invention will hereinafter be described more specifically by the following examples.

Example 1

Forty liters of whey (solid content: 6.0%. ash content: 8.2% based on the solids), which had been byproduced upon production of Gouda cheese, were treated through an electrodialyzer ("TS-24" by Tokuyama Soda Co., Ltd.) to desalt 65% of the ash contained in the starting whey. The pH of the whey thus treated was 6.4.

Of the thus-electrodialyzed whey, 34 l were subjected at SV=5 to cation exchange process using "Amberlite IR-120B" as a cation exchange resin. The remaining 6 l were caused to flow through a bypass line. They were combined together and subjected at SV =5 to anion exchange process using "Amberlite IRA-410" as an anion exchange resin, whereby a desalted whey having a desalting rate of 93% was obtained.

The pH and ash content of the desalted whey were 6.4 and 0.6% (based on solids), respectively. The recovery percentage of solids was about 90%.

Example 2

Forty liters of whey (solid content: 6.2%. ash content: 10% based on the solids), which had been byproduced upon production of acid casein, were treated through an electrodialyzer to desalt 60% of the ash contained in the starting whey. The pH of the whey thus treated was 6.0.

Next, 38 l of the thus-electrodialyzed whey were subjected at SV=3 to cation exchange process using "Duolite C-225" as a cation exchange resin After 2 l of undesalted whey (pH 4.6) were added, the resultant whey mixture was subjected at SV=3 to anion exchange process using "Duolite A-368" as an anion exchange resin so that a desalted whey having a desalting rate of 90% was obtained.

The pH and ash content of the desalted whey were 7.0 and 1.0% (based on solids), respectively.

Example 3

Forty liters of buttermilk (solid content: 5.8%. ash content: 10% based on the solids), which had been byproduced upon production of butter, were treated through an electrodialyzer to desalt 60% of the ash contained in the starting buttermilk. The pH of the buttermilk thus treated was 6.5.

Next, 35 l of the thus-electrodialyzed buttermilk were subjected at SV=4 to cation exchange process using "Duolite C-20H" as a cation exchange resin. The remaining 5 l of the electrodialyzed buttermilk was caused to flow through a bypass line. They were combined together and subjected at SV=4 to anion exchange process using "Amberlite IRA-416" as an anion exchange resin so that a desalted buttermilk having a desalting rate of 95% was obtained.

The pH and ash content of the desalted buttermilk were 6.5 and 0.5% (based on solids), respectively.

Example 4

Of 40 l of whole milk (solid content: 12%. ash content: 6% based on the solids), 39 l were treated through an electrodialyzer to desalt 70% of the ash contained in the starting whole milk. The pH of the whole milk thus treated was 6.7.

Next, 39 l of the thus-electrodialyzed whole milk were subjected at SV=6 to cation exchange process using "Duolite C-20H" as a cation exchange resin. After 1 l of the undesalted whole milk (pH 6.7) was added, the resultant milk mixture was subjected at SV=6 to anion exchange process using "Amberlite IRA-416" as an anion exchange resin so that a desalted whole milk having a desalting rate of 90% was obtained.

The pH and ash content of the desalted whole milk were 6.8 and 0.6% (based on solids), respectively.

Example 5

Of 40 l of skim milk (solid content: 9%. ash content: 8% based on the solids), 39 l were treated through an electrodialyzer to desalt 70% of the ash contained in the starting skim milk. The pH of the skim milk thus treated was 6.7.

Next, 39 l of the thus-electrodialyzed skim milk were subjected at SV=5 to cation exchange process using "DIAION SKIB" as a cation exchange resin. After 1 l of the undesalted skim milk (pH 6.7) was added, the resultant milk mixture was subjected at SV=5 to anion exchange process using "DIAION PA418" as an anion exchange resin so that a desalted skim milk having a desalting rate of 85% was obtained.

The pH and ash content of the desalted skim milk were 6.8 and 1.2% (based on solids), respectively.

Example 6

Forty liters of permeate (solid content: 7%. ash content: 10% based on the solids), which had been obtained by subjecting whey to ultrafiltration, were treated through an electrodialyzer to desalt 65% of the ash contained in the starting permeate. The pH of the permeate thus treated was 6.0.

Of the permeate thus treated, 34 l were subjected at SV =5 to cation exchange process using "Dowex CCR-2" as a cation exchange resin. The remaining 6 l of the electrodialyzed permeate were caused to flow through a bypass line. They were combined together and subjected at SV=5 to anion exchange process using "Dowex 11" as an anion exchange resin so that a desalted permeate having a desalting rate of 97% was obtained.

The pH and ash content of the desalted permeate were 6.5 and 0.3% (based on solids), respectively.

Example 7

Forty liters of a mother liquor (solid content: 10%. ash content: 17% based on the solids), which had been byproduced upon production of milk sugar from a permeate obtained by subjecting whey to ultrafiltration, were treated through an electrodialyzer to desalt 65% of the ash contained in the starting mother liquor. The pH of the mother liquor thus treated was 6.0.

Of the mother liquor thus treated, 33 l were subjected at SV=5 to cation exchange process using "Duolite C-225" as a cation exchange resin. The remaining 7 l of the electrodialyzed milk stock were caused to flow through a bypass line. They were combined together and subjected at SV=5 to anion exchange process using "Dowex 11" as an anion exchange resin so that a desalted permeate having a desalting rate of 97% was obtained.

The pH and ash content of the desalted mother liquor were 6.5 and 0.5% (based on solids), respectively.

Although the invention has been described with reference to preferred embodiments, it is to be understood that variations and modifications will be apparent to those skilled in the art and are included within the invention. Such variations and modifications are to be considered within the purview and the scope of the claims appended hereto.

We claim:

1. In a process for producing a desalted milk product, wherein at least the aqueous phase of milk or a milk fraction is subjected to the successive steps of electrodialysis, cation exchange and anion exchange, the improvement wherein between the cation exchange and the anion exchange steps, the thus-produced partly-desalted milk is mixed with an amount of milk of pH 6.0–7.0 effective to produce desalted milk with the desired pH value and ash content after the anion exchange step.

2. The process of claim 1, wherein the starting milk is at least one of whole milk, whey, permeate, mother liquor, skim milk and buttermilk.

3. The process of claim 1, wherein the milk of pH 6.0–7.0 is a portion of the milk obtained after the electrodialysis step.

4. The process of claim 1, wherein the milk of pH 6.0–7.0 is a portion of the starting milk.

5. The process of claim 1, wherein the cation exchange and anion exchange steps conducted at a flow rate SV of 2–7, a solid content of 5–40% and a temperature of 5–50° C.

6. The process of claim 1, wherein the milk of pH 6.0–7.0 is added in a proportion of 1–45 parts by weight per 100 parts by weight of the partly-desalted milk obtained after the cation exchange process.

* * * * *